(12) United States Patent
Deyoung (10) Patent No.: US 9,210,139 B2
(45) Date of Patent: Dec. 8, 2015

(54) SECURE RELAY SYSTEM

(71) Applicant: The Boeing Company, Chicago, IL (US)

(72) Inventor: Robert L. Deyoung, Martinsburg, WV (US)

(73) Assignee: THE BOEING COMPANY, Chicago, IL (US)

(*) Notice: Subject to any disclaimer, the term of this patent is extended or adjusted under 35 U.S.C. 154(b) by 15 days.

(21) Appl. No.: 14/169,413

(22) Filed: Jan. 31, 2014

(65) Prior Publication Data

US 2014/0365761 A1 Dec. 11, 2014

Related U.S. Application Data

(60) Provisional application No. 61/831,241, filed on Jun. 5, 2013.

(51) Int. Cl.
*H04L 29/06* (2006.01)
*H04L 12/58* (2006.01)

(52) U.S. Cl.
CPC ............ *H04L 63/0471* (2013.01); *H04L 51/14* (2013.01)

(58) Field of Classification Search
None
See application file for complete search history.

(56) References Cited

U.S. PATENT DOCUMENTS

| | | | |
|---|---|---|---|
| 2004/0078334 A1* | 4/2004 | Malcolm et al. | 705/50 |
| 2010/0044434 A1* | 2/2010 | Woitalla et al. | 235/411 |
| 2011/0103393 A1* | 5/2011 | Meier et al. | 370/401 |
| 2011/0238975 A1* | 9/2011 | Amemiya et al. | 713/150 |
| 2013/0080775 A1* | 3/2013 | Liebmann et al. | 713/168 |
| 2013/0332724 A1* | 12/2013 | Walters | 713/153 |

OTHER PUBLICATIONS

Niesson, "Cursor On Target," The MITRE Corporation, Power Point approved for distribution, copyright 2004, 13 pages.

* cited by examiner

*Primary Examiner* — Samson Lemma
*Assistant Examiner* — Abdulhakim Nobahar
(74) *Attorney, Agent, or Firm* — Yee & Associates, P.C.

(57) ABSTRACT

A method and apparatus for use in securely relaying data. The data is received by a first relay unit from a data provider. The data is sent by the first relay unit to a mail server. The data is retrieved by a second relay unit in a second network from the mail server. The data is sent by the second relay unit to a data subscriber.

15 Claims, 7 Drawing Sheets

SECURE RELAY SYSTEM

RELATED PROVISIONAL APPLICATION

This application claims the benefit of U.S. Provisional Patent Application Ser. No. 61/831,241, filed Jun. 5, 2013, and entitled "Secure Relay System."

BACKGROUND INFORMATION

1. Field

The present disclosure relates generally to relaying data and, in particular, to securely relaying data from a data provider to a data subscriber. Still more particularly, the present disclosure relates to a relay system that uses a mail server to securely relay data from a data provider to a data subscriber.

2. Background

The sharing of data between different types of information technology (IT) systems is oftentimes challenged by a number of different issues, such as data formatting issues, interoperability issues, and other types of issues. For example, in some situations, two different systems may produce data of the same content but using different naming conventions and/or formatting techniques.

A new standard has been developed to help resolve the data formatting and interoperability issues that challenge the exchanging of location data, status data, and other types of data on personnel, aircraft, vehicles, equipment, and other types of objects in the aerospace industry. This standard is referred to as "Cursor on Target" (CoT). The Cursor on Target standard comprises an extensible markup language (XML) specification for naming and formatting this type of data. Data that is named and formatted using this standard may be referred to as Cursor on Target data (CoT data).

Currently, Cursor on Target data is sent from one system to another system using a direct communications link between the systems. The system providing the data may be referred to as a Cursor on Target provider and the system receiving the data may be referred to as a Cursor on Target subscriber. Some systems may be configured to function as both a provider and a subscriber. Sending data in a secure manner from a Cursor on Target provider to a Cursor on Target subscriber may require that both the provider and the subscriber be connected to the same closed network or virtual private network (VPN).

However, in some situations, a Cursor on Target provider may not be connected to the same network as a Cursor on Target subscriber. Further, in some cases, a Cursor on Target provider may be implemented in a system configured to be mobile. As a result, connections to a network may be lost during movement of the system.

These issues may prevent some currently available Cursor on Target providers from being able to send data to Cursor on Target subscribers in substantially real-time or near real-time. Additionally, the amount of time and/or processing resources needed to securely send data from the Cursor on Target providers to the Cursor on Target subscribers may be greater than desired.

For example, when multiple Cursor on Target providers are designated to send data to a single Cursor on Target subscriber, a direct communications link may be needed from the subscriber to each of the providers. Establishing and maintaining these direct communications links over the required time period may not always be feasible. Therefore, it would be desirable to have a method and apparatus that takes into account at least some of the issues discussed above, as well as other possible issues.

SUMMARY

In one illustrative embodiment, a computer-implemented method for relaying data is provided. The data is received by a first relay unit from a data provider. The data is sent by the first relay unit to a mail server. The data is retrieved by a second relay unit from the mail server. The data is sent by the second relay unit to a data subscriber.

In another illustrative embodiment, an apparatus comprises a mail server, a first relay unit, and a second relay unit. The first relay unit is configured to receive data from a data provider. The first relay unit is further configured to send the data to the mail server. The second relay unit is configured to retrieve the data from the mail server. The second relay unit is further configured to send the data to a data subscriber.

In yet another illustrative embodiment, a relay system for securely relaying data from a data provider belonging to a first network to a data subscriber belonging to a second network comprises a mail server, a first relay unit, and a second relay unit. The mail server belongs to neither the first network nor the second network. The first relay unit belongs to the first network. The first relay unit is configured to receive the data from the data provider. The first relay unit is further configured to encrypt the data to form encrypted data. The first relay unit is further configured to send the encrypted data to the mail server. The second relay unit belongs to the second network. The second relay unit is configured to retrieve the encrypted data from the mail server. The second relay unit is further configured to decrypt the encrypted data to form decrypted data. The second relay unit is further configured to send the decrypted data to the data subscriber.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a system for securely relaying data from a Cursor on Target provider to a Cursor on Target subscriber without requiring a direct communications link between the provider and the subscriber.

Further, the illustrative embodiments recognize and take into account that it may be desirable to have a system capable of encrypting the data being sent between a Cursor on Target provider and a Cursor on Target subscriber that does not need the provider or the subscriber to be involved in the encryption or decryption process. Still further, the illustrative embodiments recognize and take into account that having a system for relaying data between different Cursor on Target providers and Cursor on Target subscribers may be desirable.

Thus, the illustrative embodiments provide a relay system for securely relaying data. In one illustrative embodiment, a relay system for securely relaying data from a data provider belonging to a first network to a data subscriber belonging to a second network is provided. The relay system may include a mail server, a first relay unit, and a second relay unit. The mail server may belong to neither the first network nor the second network.

The first relay unit may belong to the first network and configured to receive the data from the data provider. Further, the first relay unit may be configured to encrypt the data to form encrypted data and then send the encrypted data to the mail server. The second relay unit may belong to the second network and configured to retrieve the encrypted data from the mail server. Further, the second relay unit may be configured to decrypt the encrypted data to form decrypted data and then send the decrypted data to the data subscriber.

Figure 1:
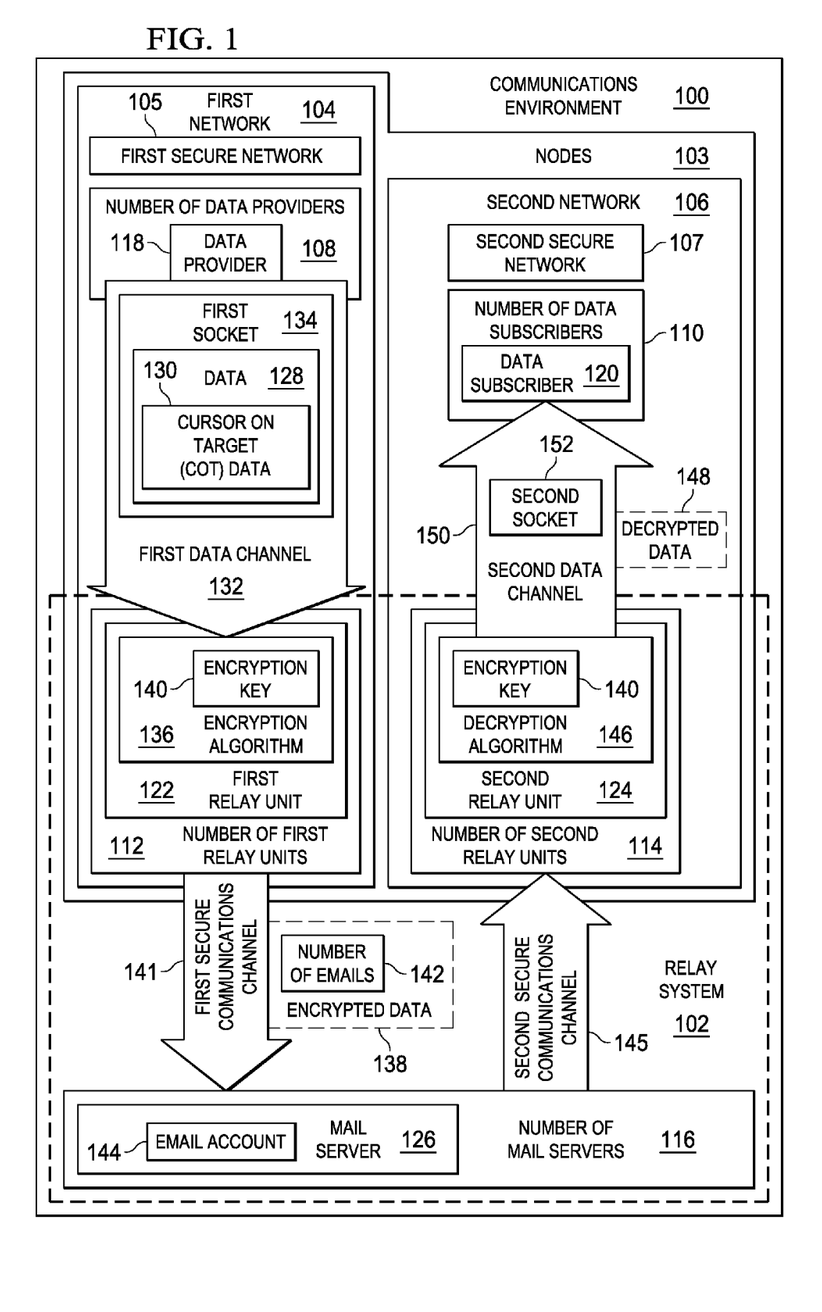
FIG. 1 is an illustration of a communications environment in the form of a block diagram in accordance with an illustrative embodiment.

Referring now to the figures and, in particular, with reference to FIG. 1, an illustration of a communications environment is depicted in the form of a block diagram in accordance with an illustrative embodiment. Communications environment 100 in FIG. 1 may be an example of an environment in which relay system 102 may be used for securely relaying data between data providers and data subscribers.

In this illustrative example, relay system 102 may be used to relay data between nodes 103 without requiring direct communications links between these nodes. As used herein, a "node" may be any device capable of sending and/or receiving data. A node may take a number of different forms. A node may take the form of a wireless communications device, a sensor device, a computer system, a robotic vehicle, a radio frequency identification tag, a global positioning system unit, a nondestructive inspection system, a cellular phone, a tablet, a switch, a router, or some other type of device capable of communicating with another device.

A node in nodes 103 may belong to one or more networks. As used herein, a "network" may be two or more nodes in communication with each other, directly or indirectly. In one illustrative example, a portion of nodes 103 may form first network 104 and another portion of nodes 103 may form second network 106. Relay system 102 may be used to relay data between first network 104 and second network 106 without requiring a direct communications link between first network 104 and second network 106.

As used herein, a "data provider" may be any system or device configured to provide, or publish, data. The data provider may or may not be the originator of the data, depending on the implementation. Further, as used herein, a "data subscriber" may be any system or device configured to receive data from a data provider. In this illustrative example, a node in first network 104 may be configured to take on the role of a data provider, a data subscriber, or both. Similarly, a node in second network 106 may be configured to take on the role of a data provider, a data subscriber, or both.

In one illustrative example, first network 104 and second network 106 may take the form of first secure network 105 and second secure network 107, respectively. Each of first secure network 105 and second secure network 107 may be a secure network by being a closed local network, a private network, a virtual private network, or some other type of secure network.

As depicted, first network 104 may include number of data providers 108. Further, second network 106 may include number of data subscribers 110. As used herein, a "number of" items may be one or more items. In this manner, number of data providers 108 may include one or more data providers. Number of data subscribers 110 may include one or more data subscribers.

Relay system 102 may be used to securely relay data from number of data providers 108 to number of data subscribers 110. Relay system 102 may include number of first relay units 112, number of second relay units 114, and number of mail servers 116.

A first relay unit in number of first relay units 112 and a second relay unit in number of second relay units 114 may be implemented using hardware, software, or a combination of the two. A mail server in number of mail servers 116 may take the form of an electronic email server configured to host and provide services for one or more email accounts.

In one illustrative example, relay system 102 may be used to relay data from data provider 118 in number of data providers 108 to data subscriber 120 in number of data subscribers 110. In particular, first relay unit 122 in number of first relay units 112, second relay unit 124 in number of second relay units 114, and mail server 126 in number of mail servers 116 may be used to relay data from data provider 118 to data subscriber 120.

First relay unit 122 may belong to first network 104, while second relay unit 124 may belong to second network 106. In one illustrative example, first relay unit 122 may take the form of a software module implemented in a same device as data provider 118, and second relay unit may 124 may take the form of a software module implemented in a same device as data subscriber 120. Of course, in other illustrative examples, first relay unit 122 may be a computer in communication with data provider 118 and second relay unit 124 may be a computer in communication with data subscriber 120.

As depicted, first relay unit 122 is configured to receive data 128 from data provider 118. In this illustrative example, data 128 may take the form of Cursor on Target (CoT) data 130. First relay unit 122 may receive data 128 from data provider 118 through first data channel 132. First data channel 132 may be implemented using first socket 134 in this illustrative example. First socket 134 may be implemented using a User Datagram Protocol (UDP) socket, a Transmission Control Protocol (TCP) socket, or some other type of socket.

First relay unit 122 uses encryption algorithm 136 to encrypt data 128 received from data provider 118 to form encrypted data 138. In one illustrative example, encryption algorithm 136 may use encryption key 140 to encrypt data 128. Encryption key 140 may be selected by a user and may be known to both first relay unit 122 and second relay unit 124. Encryption key 140 may take the form of, for example, without limitation, a password, an encryption phrase, a numeric string, or some other type of key.

First relay unit 122 may send encrypted data 138 to mail server 126. For example, first relay unit 122 may be configured to send encrypted data 138 in number of emails 142 to email account 144 on mail server 126. In one illustrative example, first relay unit 122 may use the Internet to send encrypted data 138 to mail server 126 over first secure communications channel 141.

Second relay unit 124 is configured to retrieve data 128 from mail server 126 and send data 128 to data subscriber 120. In particular, second relay unit 124 may use the Internet to check email account 144 on mail server 126 for any new emails containing encrypted data continuously, periodically, or based on some type of event. The event may be, for example, the lapse of a timer, user input being received, or some other type of event.

In response to detecting number of emails 142, second relay unit 124 retrieves number of emails 142 and encrypted data 138 in number of emails 142 over second secure communications channel 145. Second relay unit 124 uses decryption algorithm 146 to decrypt encrypted data 138 to form decrypted data 148.

Second relay unit 124 then sends decrypted data 148 to data subscriber 120 through second data channel 150. Second data channel 150 may be implemented using second socket 152 in this illustrative example. Second socket 152 may be implemented using a User Datagram Protocol (UDP) socket, a Transmission Control Protocol (TCP) socket, or some other type of socket.

In this manner, relay system 102 may be used to relay data 128 from data provider 118 to data subscriber 120 securely. In particular, relay system 102 may be used to encrypt and decrypt the data such that neither data provider 118 nor data subscriber 120 may be required to be part of the encryption process or decryption process.

Although first relay unit 122 is described as receiving data 128 from data provider 118, first relay unit 122 may be configured to receive data from one or more other data providers in number of data providers 108 in addition to, or in place of, data provider 118. Similarly, although second relay unit 124 is described as sending data 128 to data subscriber 120, second relay unit 124 may be configured to send data to one or more other data subscribers in number of data subscribers 110 in addition to, or in place of, data subscriber 120.

In some cases, second relay unit 124 may be configured to receive data from a data provider belonging to second network 106, encrypt this data to form encrypted data, and then send this encrypted data to mail server 126. Further, first relay unit 122 may then be configured to retrieve the encrypted data from mail server 126, decrypt the data to form decrypted data, and then send this decrypted data to a data subscriber belonging to first network 104.

In other illustrative examples, first relay unit 122 may be configured to both receive data from a data provider belonging to first network 104 and send data to a data subscriber belonging to first network 104 simultaneously. Second relay unit 124 may be configured to both receive data from a data provider belonging to second network 106 and send data to a data subscriber belonging to second network 106 simultaneously.

In still other illustrative examples, first relay unit 122 may be configured to receive data from multiple data providers belonging to first network 104 and then send this data to mail server 126 in the form of multiple emails to various email accounts. Different data subscribers belonging to second network 106 may then be configured to retrieve this data from the different email accounts.

In this manner, relay system 102 may be configured in any number of different ways to relay data between nodes 103. Relay system 102 may allow data to be communicated between data providers and data subscribers over the Internet in a secure manner as opposed to requiring direct communications links between data providers and data subscribers. Further, using mail servers, such as mail server 126, may reduce the cost and amount of processing resources associated with securely relaying data.

The illustration of communications environment 100 and relay system 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
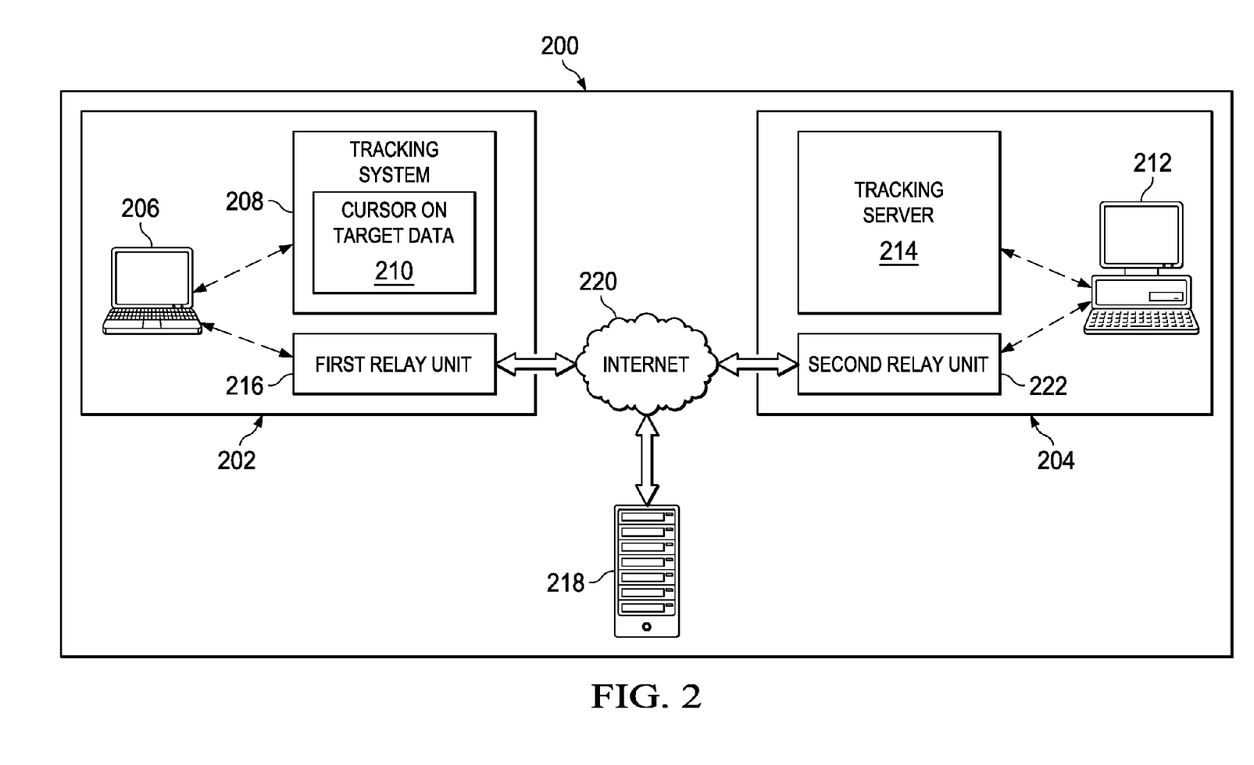
FIG. 2 is an illustration of a communications environment in accordance with an illustrative embodiment.

With reference now to FIG. 2, an illustration of a communications environment is depicted in accordance with an illustrative embodiment. Communications environment 200 may be an example of one implementation for communications environment 100 in FIG. 1. As depicted, node 202 and node 204 are present within communications environment 200. Node 202 and node 204 may be examples of implementations for nodes, such as nodes 103 in FIG. 1.

In this illustrative example, node 202 may take the form of computer system 206. Tracking system 208 may be implemented within computer system 206. Tracking system 208 may be an example of one implementation of a data provider, such as data provider 118 in FIG. 1. Tracking system 208 may be configured to produce tracking data in the form of Cursor on Target data 210.

Node 204 may take the form of server system 212. Tracking server 214 may be implemented within server system 212. Tracking server 214 may be an example of one implementation of a data subscriber, such as data subscriber 120 in FIG. 1. Tracking server 214 may be configured to receive the tracking data produced by tracking system 208. In other words, tracking server 214 subscribes to the tracking data provided by, or published by, tracking system 208.

First relay unit 216 may also be implemented within computer system 206. First relay unit 216 may be an example of one implementation for first relay unit 122 in FIG. 1. In this illustrative example, first relay unit 216 may be configured to receive Cursor on Target data 210 from tracking system 208. First relay unit 216 encrypts this data to form encrypted data and sends this encrypted data to mail server 218 using Internet 220.

Second relay unit 222 may be implemented within server system 212. Second relay unit 222 may be an example of one implementation for second relay unit 124 in FIG. 1. Second relay unit 222 may be configured to retrieve the encrypted data from mail server 218 using Internet 220. Second relay unit 222 may decrypt this data form decrypted data and then send this decrypted data to tracking server 214.

Figure 3:
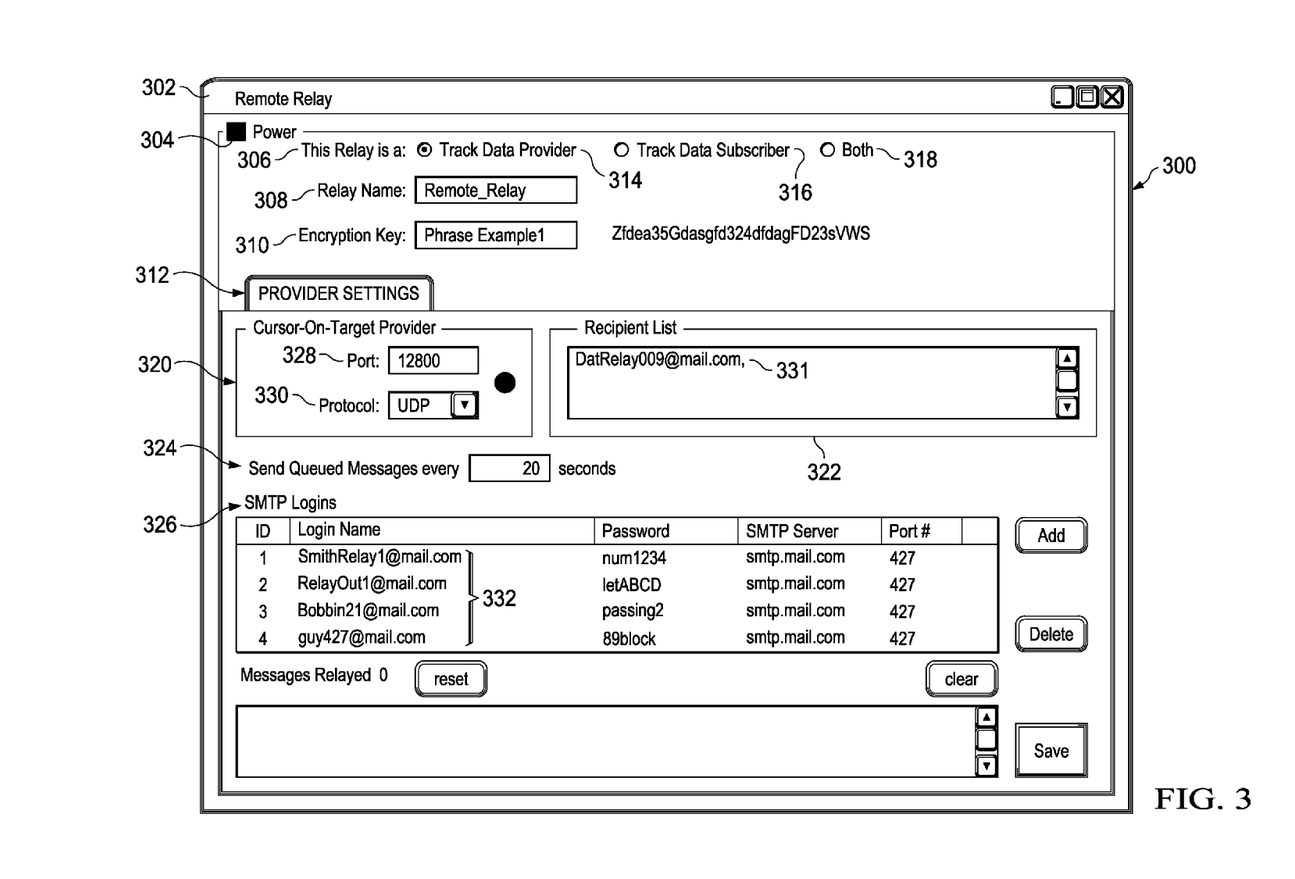
FIG. 3 is an illustration of a graphical user interface for a relay unit in accordance with an illustrative embodiment.

With reference now to FIG. 3, an illustration of a graphical user interface for a relay unit is depicted in accordance with an illustrative embodiment. In this illustrative example, graphical user interface 300 may be a graphical user interface for a relay unit, such as one of number of first relay units 112 or one of number of second relay units 114 in FIG. 1.

As depicted, graphical user interface 300 may include window 302 that allows a user to select settings for the relay unit. Window 302 visually presents power button 304, relay type 306, relay name 308, encryption key 310, and provider settings 312 to a user.

Power button 304 may be selected by a user to activate the relay unit and deselected by the user to deactivate the relay unit. In this illustrative example, power button 304 has been selected.

Relay type 306 allows a user to select whether the relay unit will be used to receive data from a data provider, send data to a data subscriber, or both. For example, a user may select provider option 314, subscriber option 316, or both option 318. In this illustrative example, provider option 314 has been selected.

Relay name 308 allows the user to input a name for the relay unit. Encryption key 310 allows the user to input an encryption key for use in encrypting data received from the data provider.

Further, provider settings 312 allow a user to customize the settings by which the relay unit is to receive data from the data provider and then send the data to a mail server. As depicted, provider settings 312 include Cursor on Target provider settings 320, recipient list 322, send rate 324, and login list 326.

Cursor on Target provider settings 320 include port 328 and protocol 330. Port 328 and protocol 330 allow a user to specify which port and socket protocol, respectively, are to be used to receive the data from the data provider. Recipient list 322 allows a user to specify to which email account emails containing the encrypted data are to be sent. As depicted, email account 331 has been entered.

Further, send rate 324 allows a user to select the frequency with which emails are to be sent to email account 331. As depicted, the relay unit has been set to send emails to email account 331 about every 20 seconds.

Login list 326 identifies the different email accounts from which the emails are to be sent to email account 331. As depicted, sender email accounts 332 are to be used to send emails to email account 331.

Figure 4:
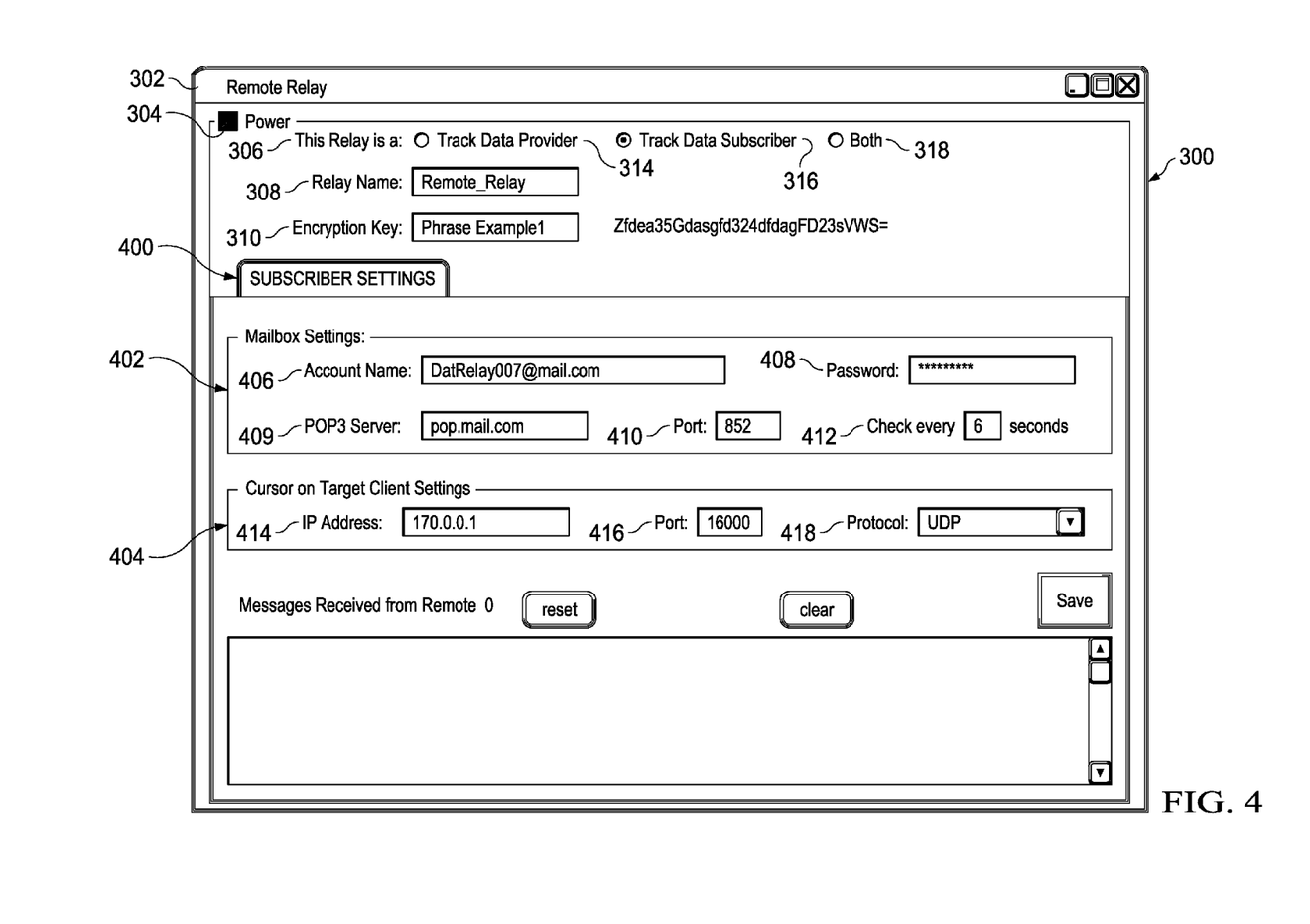
FIG. 4 is an illustration of a graphical user interface for a relay unit in accordance with an illustrative embodiment.

With reference now to FIG. 4, an illustration of a graphical user interface for a relay unit is depicted in accordance with an illustrative embodiment. In this illustrative example, graphical user interface 300 from FIG. 3 is depicted. As depicted, subscriber option 316 has been selected. Consequently, subscriber settings 400 are visually presented to a user instead of provider settings 312 in FIG. 3.

Subscriber settings 400 include mailbox settings 402 and Cursor on Target subscriber settings 404. Mailbox settings 402 include settings for the email account from which emails are to be retrieved and the mail server hosting the email account. As depicted, mailbox settings 402 include email account name 406, email password 408, server name 409, port 410, and refresh rate 412.

Email account name 406 allows the user to indicate the name of the email account to be checked. Email password 408 allows the user to specify the password to be used to access this email account. Server name 409 allows the user to specify which mail server to check and port 410 allows the user to specify the port through which emails are to be retrieved. Refresh rate 412 allows the user to specify the frequency with which the email account will be checked for new emails. As depicted, the relay unit has been set to check for new emails about every 6 seconds.

Cursor on Target subscriber settings 404 allow a user to select settings for the data subscriber to which the relay unit is to send the data that has been retrieved from the email account and decrypted using the encryption key specified in encryption key 310. As depicted, Cursor on Target subscriber settings 404 include address 414, port 416, and protocol 418.

Address 414 allows the user to enter the internet protocol (IP) address at which the data subscriber can be found. Further, port 416 and protocol 418 allow the user to specify the port and protocol, respectively, to be used in sending the decrypted data to the data subscriber.

Although graphical user interface 300 in FIGS. 3-4 is described as being used to receive user input from a user, any of the user inputs and/or user selections described above may be automated in accordance with a predefined schema. Automating the inputting of data and/or selections into graphical user interface 300 may further reduce costs of the relay system.

The illustrations of communications environment 200 in FIG. 2 and graphical user interface 300 in FIGS. 3-4 are not meant to imply physical or architectural limitations to the manner in which an illustrative embodiment may be implemented. Other components in addition to or in place of the ones illustrated may be used. Some components may be optional.

Figure 5:
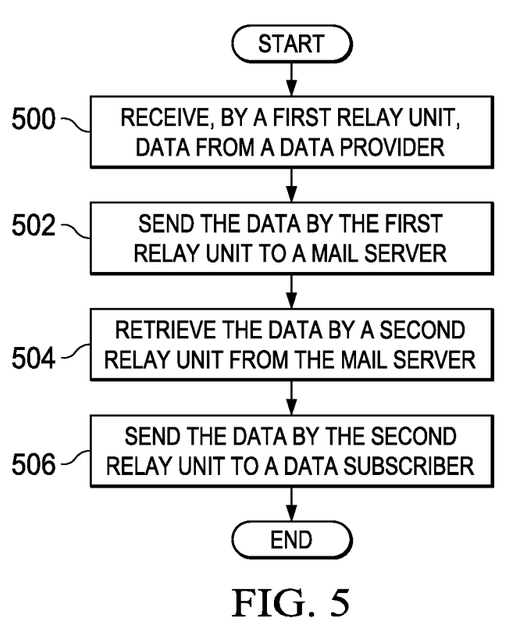
FIG. 5 is an illustration of a process for relaying data in the form of a flowchart in accordance with an illustrative embodiment.

With reference now to FIG. 5, an illustration of a process for relaying data is depicted in the form of a flowchart in accordance with an illustrative embodiment. The process illustrated in FIG. 5 may be implemented using relay system 102 in FIG. 1.

The process may begin by receiving, by a first relay unit, data from a data provider (operation 500). The data is sent by the first relay unit to a mail server (operation 502).

Next, the data is retrieved by a second relay unit from the mail server (operation 504). Thereafter, the data is sent by the second relay unit to a data subscriber (operation 506), with the process terminating thereafter.

Figure 6:
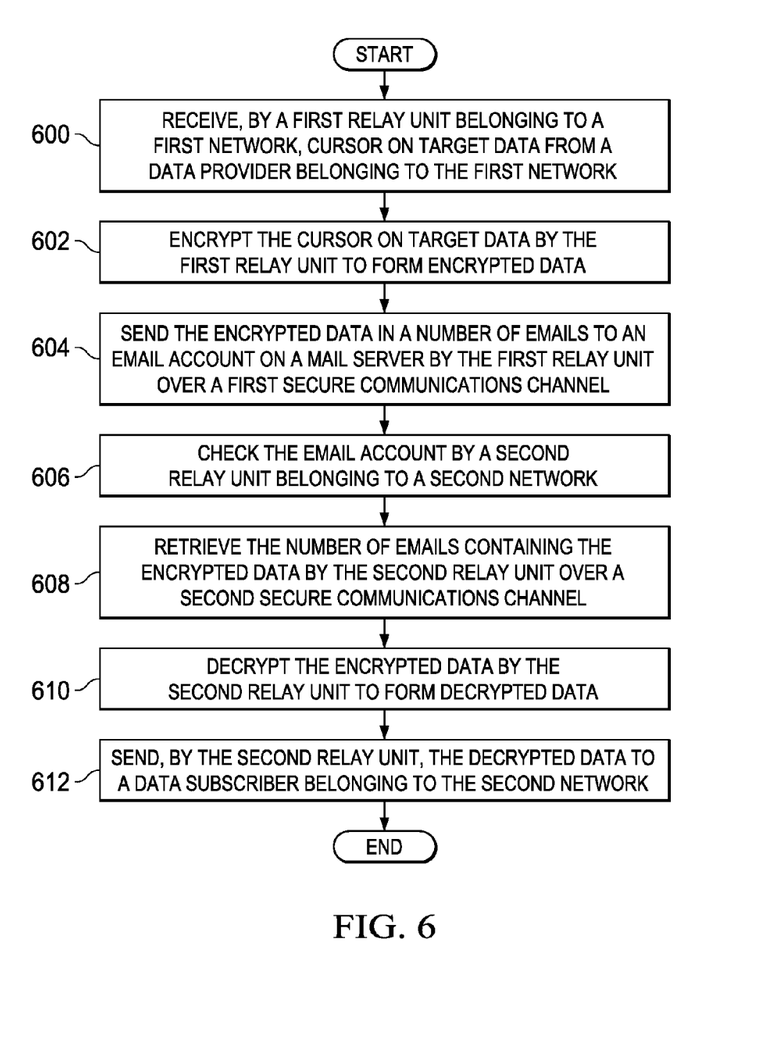
FIG. 6 is an illustration of a process for relaying data in the form of a flowchart in accordance with an illustrative embodiment.

With reference now to FIG. 6, an illustration of a process for relaying data is depicted in the form of a flowchart in accordance with an illustrative embodiment. The process illustrated in FIG. 6 may be implemented using relay system 102 in FIG. 1.

The process may begin by receiving, by a first relay unit belonging to a first network, Cursor on Target data from a data provider belonging to the first network (operation 600). Next, the Cursor on Target data is encrypted by the first relay unit to form encrypted data (operation 602). The encrypted data may be formed using an encryption key selected by a user.

The encrypted data is then sent in a number of emails to an email account on a mail server by the first relay unit over a first secure communications channel (operation 604). Thereafter, the email account is checked by a second relay unit belonging to a second network (operation 606). The mail server may belong to neither the first network nor the second network.

The number of emails containing the encrypted data may then be retrieved by the second relay unit over a second secure communications channel (operation 608). The encrypted data is then decrypted by the second relay unit to form decrypted data (operation 610). Next, the decrypted data is sent, by the second relay unit, to a data subscriber belonging to the second network (operation 612), with the process terminating thereafter.

Figure 7:
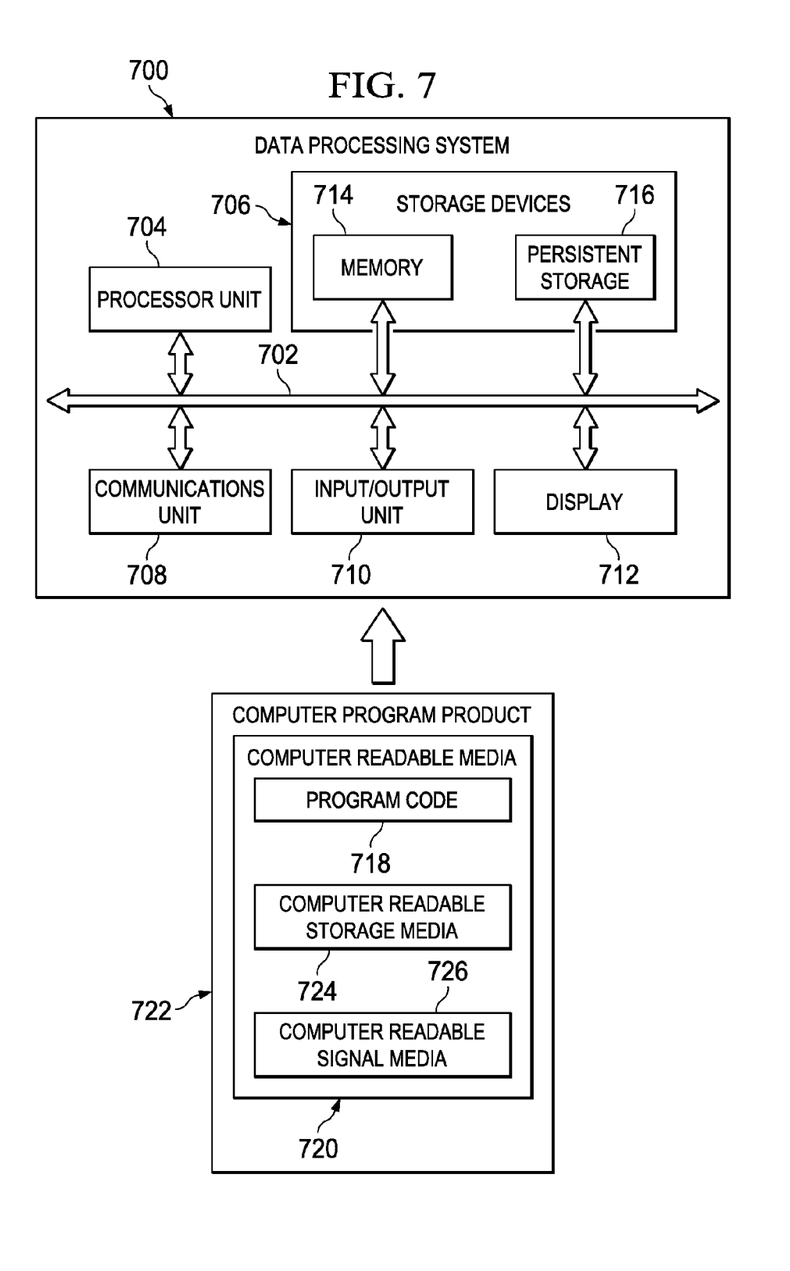
FIG. 7 is an illustration of a data processing system in the form of a block diagram in accordance with an illustrative embodiment.

Turning now to FIG. 7, an illustration of a data processing system in the form of a block diagram is depicted in accordance with an illustrative embodiment. Data processing system 700 may be used to implement a node in nodes 103, a data provider in number of data providers 108, a data subscriber in number of data subscribers 110, a relay unit in number of first relay units 112 and/or number of second relay units 114, and/or a mail server in number of mail servers 116.

As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multi-processor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer readable storage device, is any piece of hardware capable of storing information on a temporary and/or permanent basis. This information may include, but is not limited to, data, program code, and/or other information.

Memory 714 and persistent storage 716 are examples of storage devices 706. Memory 714 may take the form of, for example, a random access memory or some type of volatile or non-volatile storage device. Persistent storage 716 may comprise any number of components or devices. For example, persistent storage 716 may comprise a hard drive, a flash memory, a rewritable optical disk, a rewritable magnetic tape, or some combination of the above. The media used by persistent storage 716 may or may not be removable.

Communications unit 708 allows data processing system 700 to communicate with other data processing systems and/or devices. Communications unit 708 may provide communications using physical and/or wireless communications links.

Input/output unit 710 allows input to be received from and output to be sent to other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touch screen, a laser display, a holographic display, a virtual display device, and/or some other type of display device.

In this illustrative example, the processes of the different illustrative embodiments may be performed by processor unit 704 using computer-implemented instructions. These instructions may be referred to as program code, computer usable program code, or computer readable program code and may be read and executed by one or more processors in processor unit 704.

In these examples, program code 718 is located in a functional form on computer readable media 720, which is selectively removable, and may be loaded onto or transferred to data processing system 700 for execution by processor unit 704. Program code 718 and computer readable media 720 together form computer program product 722. In this illustrative example, computer readable media 720 may be computer readable storage media 724 or computer readable signal media 726.

Computer readable storage media 724 is a physical or tangible storage device used to store program code 718 rather than a medium that propagates or transmits program code 718. Computer readable storage media 724 may be, for example, without limitation, an optical or magnetic disk or a persistent storage device that is connected to data processing system 700.

Alternatively, program code 718 may be transferred to data processing system 700 using computer readable signal media 726. Computer readable signal media 726 may be, for example, a propagated data signal containing program code 718. This data signal may be an electromagnetic signal, an optical signal, and/or some other type of signal that can be transmitted over physical and/or wireless communications links.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for relaying data securely. In one illustrative embodiment, a tracking system may be installed in a computer system at a hotel downrange outside of the United States and connected to the hotel's Internet connection. This tracking may be monitoring several different handsets that are reporting messages to the tracking system using encrypted short message service (SMS). These messages may then need to be sent to a tracking server located stateside. A relay system, such as relay system 102 in FIG. 1, may be used to send the messages to the tracking server without requiring a direct communications link between the tracking system and the tracking server. In other words, the tracking system may not need to know the Internet protocol address of the tracking server.

A first relay unit in the relay system may be installed on the same computer system as the tracking system. In particular, the tracking system and the first relay unit may be part of the same network. The first relay unit may be configured to listen to a socket to receive the messages from the tracking system. The data may be received as Cursor on Target data. Upon receiving the messages from the tracking system, the first relay unit encrypts each message individually using a designated encryption algorithm and an encryption key that may be derived from a user-supplied pass phrase.

At some pre-defined interval, the encrypted messages may be put into an email document and sent to a predefined email address, or multiple email addresses, using an email service on an email server and the Internet. The connection between the first relay unit and the email server may be encrypted. In this manner, the messages may be considered twice encrypted when sent to the email address or email addresses. If the Internet is down or otherwise unavailable, these messages will continue to queue until Internet connectivity is re-established.

Because the first relay unit is listening on a socket, the first relay unit could serve as a relay to multiple data providers in addition to the tracking system. The tracking system may not be aware that the data is actually being pushed to the first relay unit instead of directly to the tracking server.

A second relay unit in the relay system may be installed on a computer system or device belonging to a same network as the tracking server. In this illustrative example, the second relay unit is configured to check the email account where the first relay unit is sending the encrypted messages. The second relay unit begins checking the specified email server, which may be a POP3 server, for incoming messages once the "power" has been turned on and the second relay unit activated. Incoming messages containing the encrypted data are decrypted using the same encryption key that was used to encrypt the data. The decrypted data is then pushed to the port designated for the tracking server. If Internet access is interrupted or unavailable for some time, the second relay unit will pick up all the messages that are waiting on the email server, and push every message to the tracking server when Internet access is restored.

Thus, the relay system described by the different illustrative examples above may provide data encryption for Cursor on Target data and/or other types of data. Further, the relay system may use a data path that does not require a public Internet protocol address for either the data provider or the data subscriber. The relay system may allow a store-and-forward process that helps minimize data loss.

Additionally, additional levels of security may be provided in that the relay system may use a low-visibility Internet connection as compared to a higher-visibility virtual private network connection. The relay system may be used to deliver data to multiple subscribers simultaneously. Further, with this type of relay system, minimal to no modifications may need to be made to the existing configurations of data providers and data subscribers.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for relaying data, the method comprising:
   receiving, by a first relay device, the data from a data provider via a first socket;
   encrypting, by the first relay device, the data received at the first relay device to form encrypted data;
   sending, by the first relay device, the encrypted data to a mail server;
   including the encrypted data received in the first socket in an email;
   retrieving, by a second relay device, over a secure communication channel, based on a lapse of a timer, the data within the email from the mail server;
   decrypting, by the second relay device, the encrypted data to form decrypted data; and
   sending, by the second relay device, the decrypted data to a data subscriber via a second socket on the second relay device;
   wherein the data comprise Cursor on Target (CoT) tracking data; and
   wherein the data is relayed between different Cursor on Target providers and Cursor on Target subscribers without requiring a direct communications link between the different Cursor on Target providers and Cursor on Target subscribers.

2. The computer-implemented method of claim 1, wherein the email is a number of emails, and wherein sending, by the first relay device, the data to the mail server further comprises:
   sending, by the first relay device, the encrypted data in the number of emails to an email account on the mail server.

3. The computer-implemented method of claim 2, wherein retrieving, by the second relay device, the data from the mail server comprises:
   checking, by the second relay device, the email account on the mail server for emails containing the encrypted data; and
   retrieving the number of emails containing the encrypted data from the mail server in response to detecting the number of emails in the email account.

4. The computer-implemented method of claim 1, wherein sending, by the first relay device, the data to the mail server comprises:
   sending, by the first relay device, encrypted data to the mail server over a secure communications channel.

5. The computer-implemented method of claim 1, wherein retrieving, by the second relay device, the data from the mail server comprises:
   retrieving, by the second relay device, the data from the mail server over a secure communications channel.

6. An apparatus comprising:
   a mail server;
   a first relay device configured to receive data from a data provider via a first socket, encrypt the data received from the data provider to form encrypted data, send the encrypted data to the mail server, and include the encrypted data received in the first socket in an email; and
   a second relay device configured to retrieve the encrypted data within the email from the mail server over a secure communication channel, based on a lapse of a timer, decrypt the encrypted data to form decrypted data, and send the decrypted data to a data subscriber from a second socket on the second relay device;
   wherein the data comprise Cursor on Target (CoT) data; and
   wherein the data is relayed between different Cursor on Target providers and Cursor on Target subscribers without requiring a direct communications link between the different Cursor on Target providers and Cursor on Target subscribers.

7. The apparatus of claim 6, wherein the data is encrypted and the encrypted data is decrypted using a password selected by a user.

8. The apparatus of claim 6, wherein the first relay device is configured to send the encrypted data in a number of emails to an email account on the mail server.

9. The apparatus of claim 8, wherein the second relay device is configured to retrieve the encrypted data by checking the email account on the mail server for any new emails containing the encrypted data.

10. The apparatus of claim 6, wherein the data provider and the first relay device belong to a first network, wherein the data subscriber and the second relay device belong to a second network.

11. The apparatus of claim 10, wherein the mail server belongs to neither the first network nor the second network.

12. The apparatus of claim 6, wherein the first relay device is configured to send the data to the mail server over a first secure communications channel and wherein the second relay device is configured to retrieve the data from the mail server over a second secure communications channel.

13. The apparatus of claim 6, wherein the first relay device and the second relay device are configured to communicate with the mail server using Internet and wherein the first relay device is configured to receive the data from the data provider through the first socket and the second relay device is configured to send the data to the data subscriber through the second socket.

14. A relay system for securely relaying data from a data provider belonging to a first network to a data subscriber belonging to a second network, the relay system comprising:

a mail server belonging to neither the first network nor the second network;

a first relay device belonging to the first network and configured to receive the data from the data provider via a first socket, encrypt the data to form encrypted data, send the encrypted data to the mail server, and include the data received in the first socket in an email; and a second relay device belonging to the second network and configured to retrieve the encrypted data within the email from the mail server, over a secure communications channel, based on a lapse of a timer, decrypt the encrypted data to form decrypted data, and send the decrypted data to the data subscriber via a second socket on the second relay;

wherein the data comprise Cursor on Target (CoT) data; and wherein the data is relayed between different Cursor on Target providers and Cursor on Target subscribers without requiring a direct communications link between the different Cursor on Target providers and Cursor on Target subscribers.

15. The computer-implemented method of claim 1, wherein the data provider provides the data to the first relay device as User Datagram Protocol (UDP) formatted data.

* * * * *